United States Patent
Fukuhara et al.

(10) Patent No.: US 8,014,335 B2
(45) Date of Patent: Sep. 6, 2011

(54) WIRELESS NETWORK SYSTEM, RELAY TERMINAL AND PROGRAM

(75) Inventors: Tadayuki Fukuhara, Kamifukuoka (JP); Takayuki Warabino, Kamifukuoka (JP); Kenji Saito, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 541 days.

(21) Appl. No.: 11/064,733

(22) Filed: Feb. 23, 2005

(65) Prior Publication Data
US 2005/0201316 A1    Sep. 15, 2005

(30) Foreign Application Priority Data

Feb. 27, 2004    (JP) .................................. 2004-055227

(51) Int. Cl.
*H04B 7/14*    (2006.01)

(52) U.S. Cl. ........ 370/315; 370/312; 370/406; 370/389; 370/254; 455/7; 455/445

(58) Field of Classification Search .................. 370/315, 370/310, 252, 332, 312, 406, 389, 254, 351, 370/392, 238; 375/211, 213; 455/7, 9, 11.1, 455/404.1, 404.2, 521, 428, 445
See application file for complete search history.

(56) References Cited

U.S. PATENT DOCUMENTS

| | | | |
|---|---|---|---|
| 2002/0035554 A1* | 3/2002 | Katsuno et al. | 706/17 |
| 2003/0048747 A1* | 3/2003 | Tazawa et al. | 370/223 |
| 2004/0072581 A1* | 4/2004 | Tajima et al. | 455/456.1 |
| 2004/0190476 A1* | 9/2004 | Bansal et al. | 370/338 |
| 2004/0215373 A1 | 10/2004 | Won et al. | |

FOREIGN PATENT DOCUMENTS

| | | |
|---|---|---|
| JP | 11-306488 | 11/1999 |
| JP | 2001-339399 | 12/2001 |
| JP | 2003-087169 | 3/2003 |
| JP | 2004-297237 | 10/2004 |
| JP | 2004-326791 | 11/2004 |

* cited by examiner

*Primary Examiner* — Patrick N Edouard
*Assistant Examiner* — Fred A Casca
(74) *Attorney, Agent, or Firm* — George W. Neuner; Edwards Angell Palmer & Dodge LLP

(57) ABSTRACT

A wireless network system relays a broadcast signal in multiple stages and distributes data to terminals there around, and relay terminals determine whether to relay broadcast packets according to the direction vector and the position information, specified by the information transmission source terminal, referring to their own position information and direction, and relay and accept the packets or ignore them.

4 Claims, 9 Drawing Sheets

WIRELESS NETWORK SYSTEM, RELAY TERMINAL AND PROGRAM

BACKGROUND OF THE INVENTION

1. Field of the Invention

This invention relates to the field of wireless network systems, and relay terminals and programs in the wireless network systems, in which an information transmission source terminal broadcasts data, and in which relay terminals relay in multiple stages and distribute data to peripheral terminal devices.

Priority is claimed on Japanese Patent Application No. 2004-55227, filed Feb. 27, 2004, the content of which is incorporated herein by reference.

2. Description of Related Art

In the wireless network system, a technique called "flooding" is applied to notify receipt of broadcasted packets. "Flooding" is a technique to distribute data to terminals distributed around an information transmission source terminal. The information transmission source terminal transfers (broadcasts) the broadcast packet and all the terminals that receive it broadcast it. The process is repeated. In other words, when processing a flooding, data is transferred to terminals located in all the directions.

On the other hand, for the purpose of reducing the number of terminal equipment to relay, "the information transmission method, the information transmission system, the information terminal, and the information memory medium" (for example, in Japanese Patent Application, Unexamined Publication No. 2001-339399) have been proposed. In this proposal, terminals relay the data only when the current information direction vector and the current direction vector show the same direction. The current information direction vector shows the movement of the data from the information transmission source terminal to the reply terminal. The current direction vector shows the movement direction of the relay terminal. However, the method transfers the data in all the directions.

In some cases, the data can be effective only for the terminals in some directions and some positions. In this case, the data cannot be useful in other directions and other positions. Transferring such data to all directions wastes electric power and resources for wireless terminals.

For example, in the case of a multi-hop radio network, formed among cars, informs about the approach of the emergency vehicle. Information has importance for cars in the area where an emergency vehicle will pass by shortly. With the conventional technique, notifying information in all directions, wireless terminals, behind the emergency vehicle, might waste resources. Also, in notification of traffic accident information, the information is meaningful for cars which head for the place where the accident occurred. That is why, for example, on a one-way road, it can also be a waste of the wireless terminal resources.

SUMMARY OF THE INVENTION

In view of the above-mentioned circumstances, the invention aims to offer the relay terminal and the program in the wireless network system which achieves effective use of the resource of the wireless terminal. The system in this invention, referring to the position information and the direction vector, given by the information transmission source terminal, distinguishes whether or not to relay the received broadcast packet.

According to the first aspect of the invention, a wireless network system relaying a broadcast signal in multiple stages and distributes data to terminals there around, comprises: a transmission source terminal which generates the broadcast-signal; and multiple relay terminals which determine whether it is necessary to relay a broadcast packet according to a direction vector and a position information specified by the information transmission source terminal referring to the position information and its own direction.

According to the second aspect of the invention, a relay terminal in a wireless network system which relays a broadcast-signal in multiple stages and distributes data to terminals there around, comprises: a packet receiving part which receives a broadcast packet from an information transmission source terminal; a self-position information acquisition part which determines its own position; and a relay judging part which determines whether it is necessary to relay the broadcast packet according to a direction vector and position information in the broadcast packet, specified by the information transmission source terminal.

According to the third aspect of the invention, in the above-mentioned relay terminal, the relay judging part determines whether to relay the broadcast packet according to an available angle range specified by the information transmission source terminal in the broadcast packet.

According to the fourth aspect of the invention, in the above-mentioned relay terminal, the relay judging part determines whether to relay the broadcast packet according to relay position range in the broadcast packet, specified by the information transmission source terminal.

According to the fifth aspect of the invention, the above-mentioned relay terminal further provides an acceptance judging part which determines whether to accept the broadcasted packet according to a data available range in the broadcast packet, specified by the information transmission source terminal.

According to the fifth aspect of the invention, a program for a relay terminal in a wireless network system which relays a broadcast signal in multiple stages and distributes data to terminals there around, comprises: a packet receiving process which receives a broadcast packet from a transmission source; a self-position information acquisition process which obtains position of the relay terminal; and a relay judging process which determines whether to relay the broadcast packet according to a direction vector in the broadcast packet, specified by the information transmission source terminal, and position information.

The system in this invention, referring to the position information and the direction vector, given by the information transmission source, distinguishes whether or not to relay the received broadcast packet. This helps to reduce the amount of unnecessary data relay and terminals accept the data only when it is required. This invention therefore achieves effective use of wireless terminal resources. Also, terminals can prevent transmission of packets which are useless and save the electric power.

This invention is effective for an information distribution in the network with ad hock data transmission such as information of approaching emergency vehicles or accident information, especially in ITSs (Intelligent Transport Systems).

DETAILED DESCRIPTION OF THE INVENTION

Figure 1:
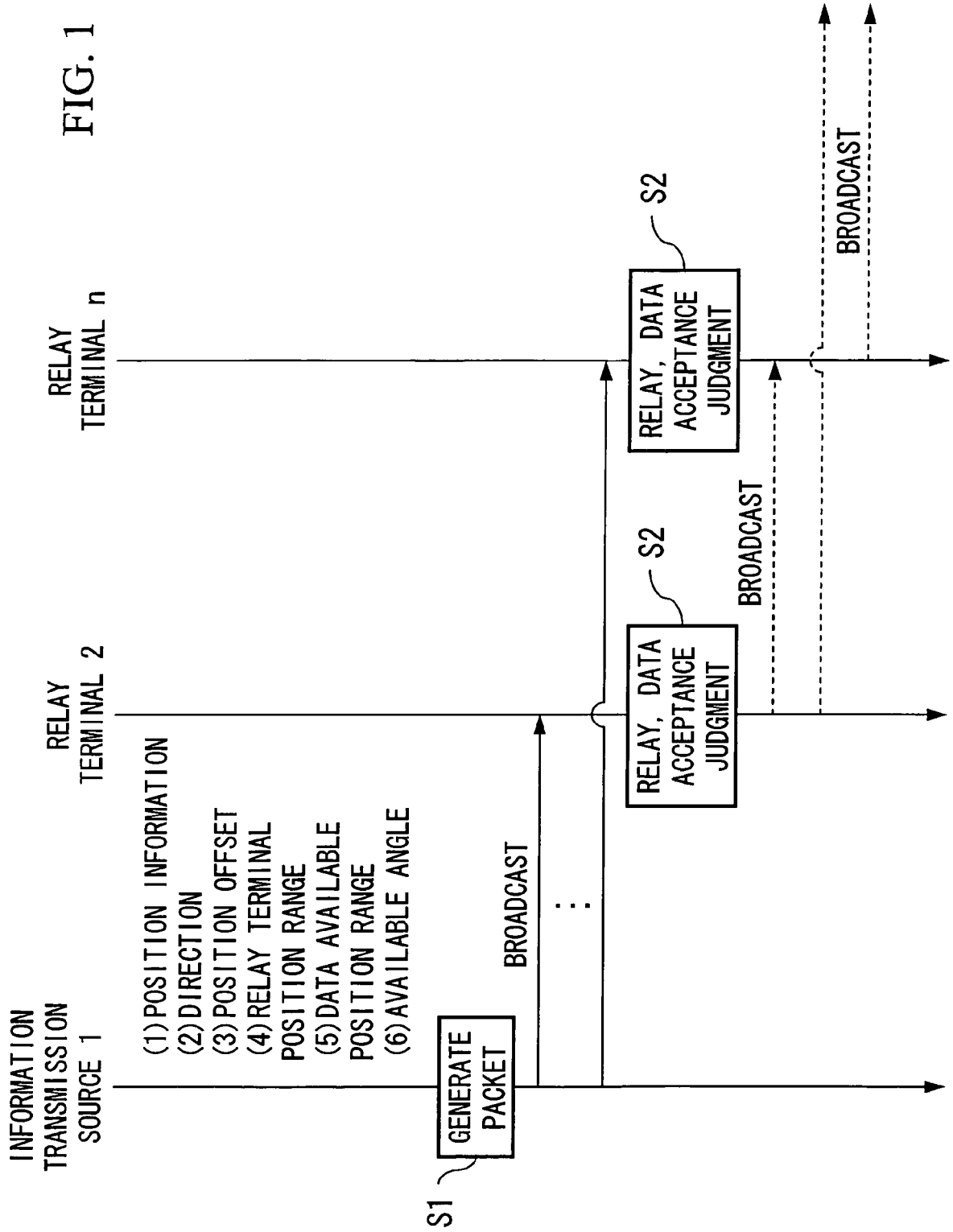
FIG. 1 shows the process sequence of the wireless network system in this invention.

FIG. 1 shows a process sequence of the wireless network system in this invention. In FIG. 1, the relationship between a broadcasting terminal as information transmission source 1 and relay terminals 2 to n (n is an integer, larger than or equal to 2) are shown.

In FIG. 1, information transmission source 1 adds a parameters about its own "position information", "direction", "position offset", "relay terminal position range", "data available position range", and "available angle range" to the broadcast packet and transmits it (S1). The "position offset" is an offset for shifting a reference position from an actual position of information transmission source 1 to the rear direction with respect to the direction of the movement. The "relay terminal position range" is a distance from information transmission source 1 for determining whether the relay terminals 2-n perform relay. When the distance is smaller than the "relay terminal position range", relay terminal 2-n relay the data from information transmission source 1 to other relay terminals. The "data available position range" is a distance from information transmission source 1 for determining whether the relay terminals 2-n notify information to an application program. When the distance from the source 1 to relay terminal 2-n is smaller than the threshold, relay terminal 2-n notifies the existence of the information transmission source 1 to the appropriate application program.

The relay terminal 2 receives the broadcast packet from information transmission source 1, and calculates the position vector, starting from information transmission source 1 as the reference, referring to its own position information. Moreover, the position vector is calculated based on the position that is shifted only for the position offset from the position information of information transmission source 1, to the reverse direction of the direction of the movement of information transmission source 1.

Figure 5:
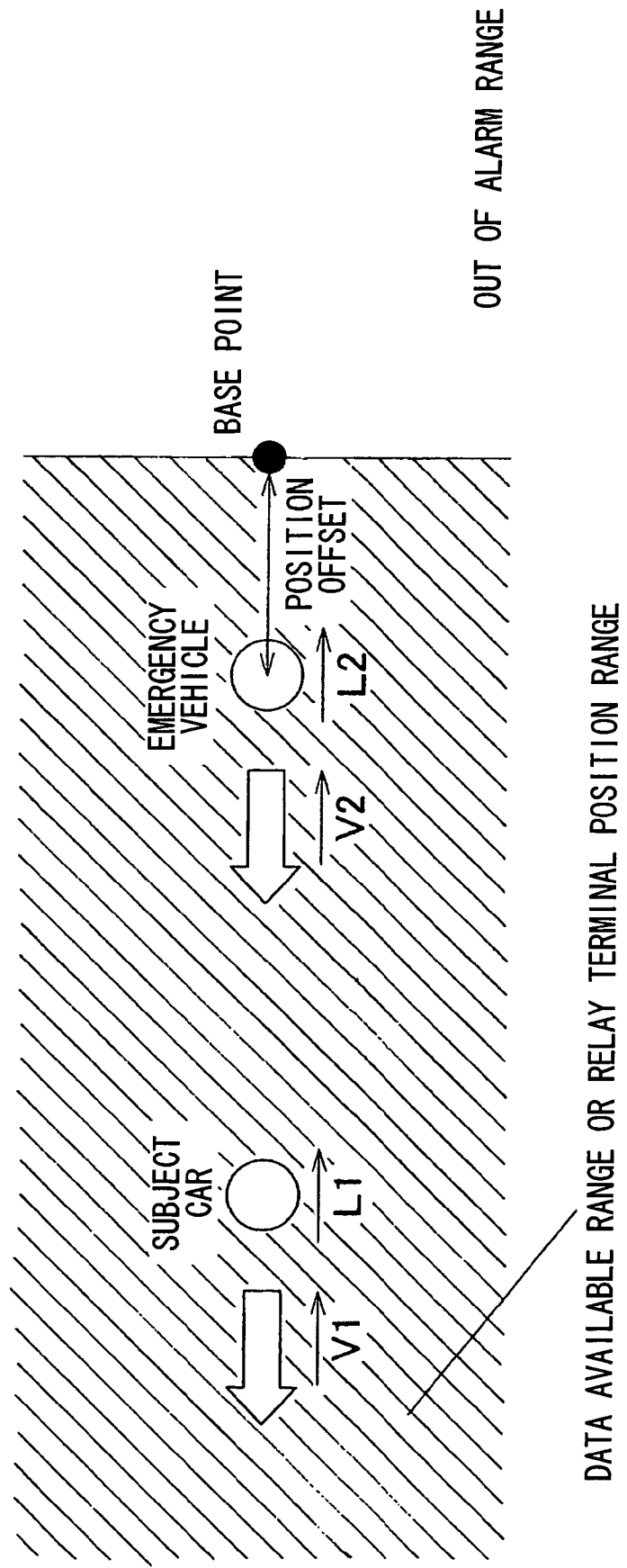
FIG. 5 describes positions between the car and the emergency vehicle.

Also, relay terminal 2 takes data from information transmission source 1 as a candidate to relay and accept data when cosine θ obtained from the inner product of the "direction" vector and position vector is larger than the value obtained from "available angle range". For example, when "available angle range" is 90 degrees and when cosine θ is larger than 0, data from information transmission source 1 can be a candidate. When data from information transmission source 1 is a candidate, relay terminal 2 calculates the size of the position vector. Also, relay terminal 2 relay from information transmission source 1 when the size of the position vector is smaller than the "relay terminal position range". Also, relay terminal 2 accepts the data from information transmission source 1 when the size of position vector is smaller than the "data available position range". FIG. 5 shows "data available position range" or "relay terminal position range" with hatching, including the relationship between a vehicle and approaching emergency vehicle as mentioned above.

Figure 2:
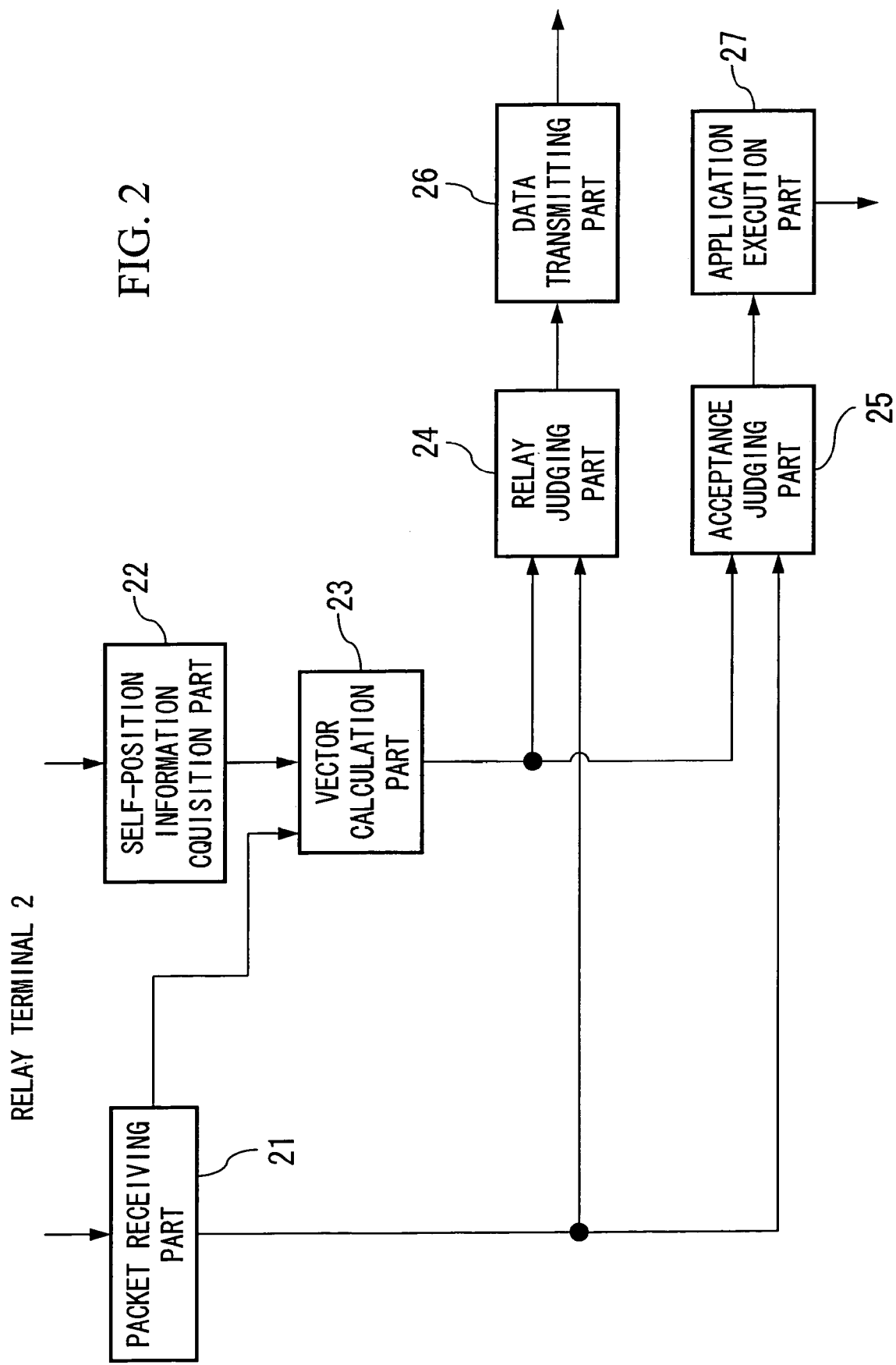
FIG. 2 shows a block diagram which shows the internal design of the relay terminal from the functional point of view in this invention.

FIG. 2 is the block diagram which shows internal design of relay terminal in one implementation of this invention.

Relay terminal 2 judges whether or not the received broadcast packets should be relayed according to the position and direction vector of itself, based on the direction vector and position information specified by information transmission source 1. The relay terminal 2 is comprised of packet receiving part 21, self-position information acquisition part 22, vector calculation part 23, relay judging part 24, acceptance judging part 25, data transmitting part 26, and application execution part 27.

Packet receiving part 21 receives the broadcasted packet from information transmission source 1 and supplies it to vector calculation part 23, relay judging part 24 and acceptance judging part 25. Self-position information acquisition part 22 calculates its own position information and supplies the information to vector calculation part 23, using, for example a GPS (Global Positioning System) receiver.

Vector calculation part 23 performs a vector operation referring to the direction vector and the position information which are specified by the transmission source terminal, and to the position information and direction vector of relay terminal 2, and supplies the operation results to relay judging part 24 and acceptance judging part 25. Relay judging part 24 determines whether or not the relay of received broadcast packets is required, based on the vector value output from the vector calculation part 23 and on "relay terminal position range". Acceptance judging part 25 determines whether or not packets received by packet receiving part 21 should be accepted, based on the vector value output from vector calculation part 23, "data available position range", referring to "data available position range" contained in the broadcasted packets received by packet receiving part 23.

The determination results are transmitted to data transmitting part 26 and application execution part 27, so that data is transmitted or application programs are executed.

Figure 3:
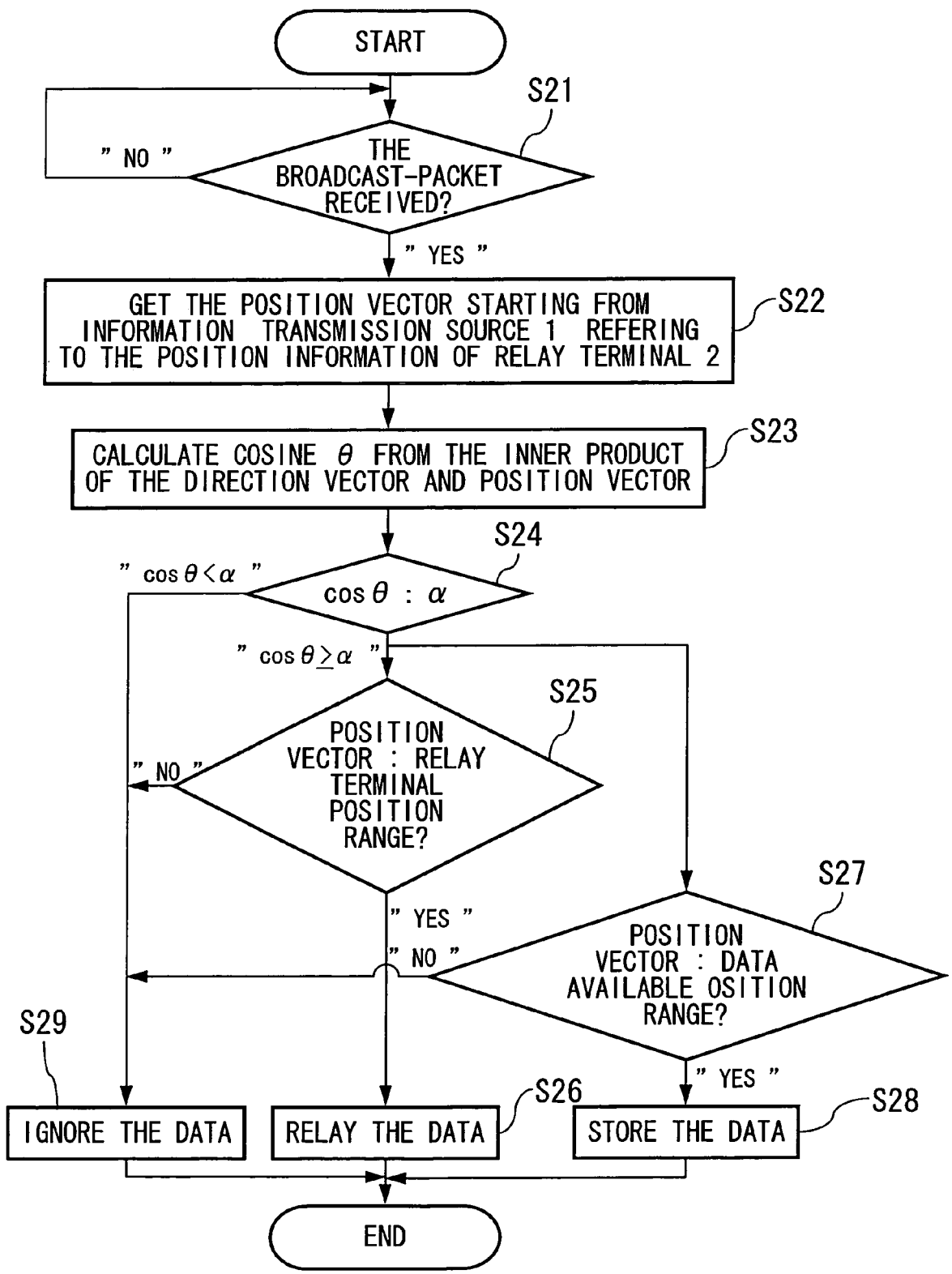
FIG. 3 shows a flow chart of the process in relay terminal.
Figure 6:
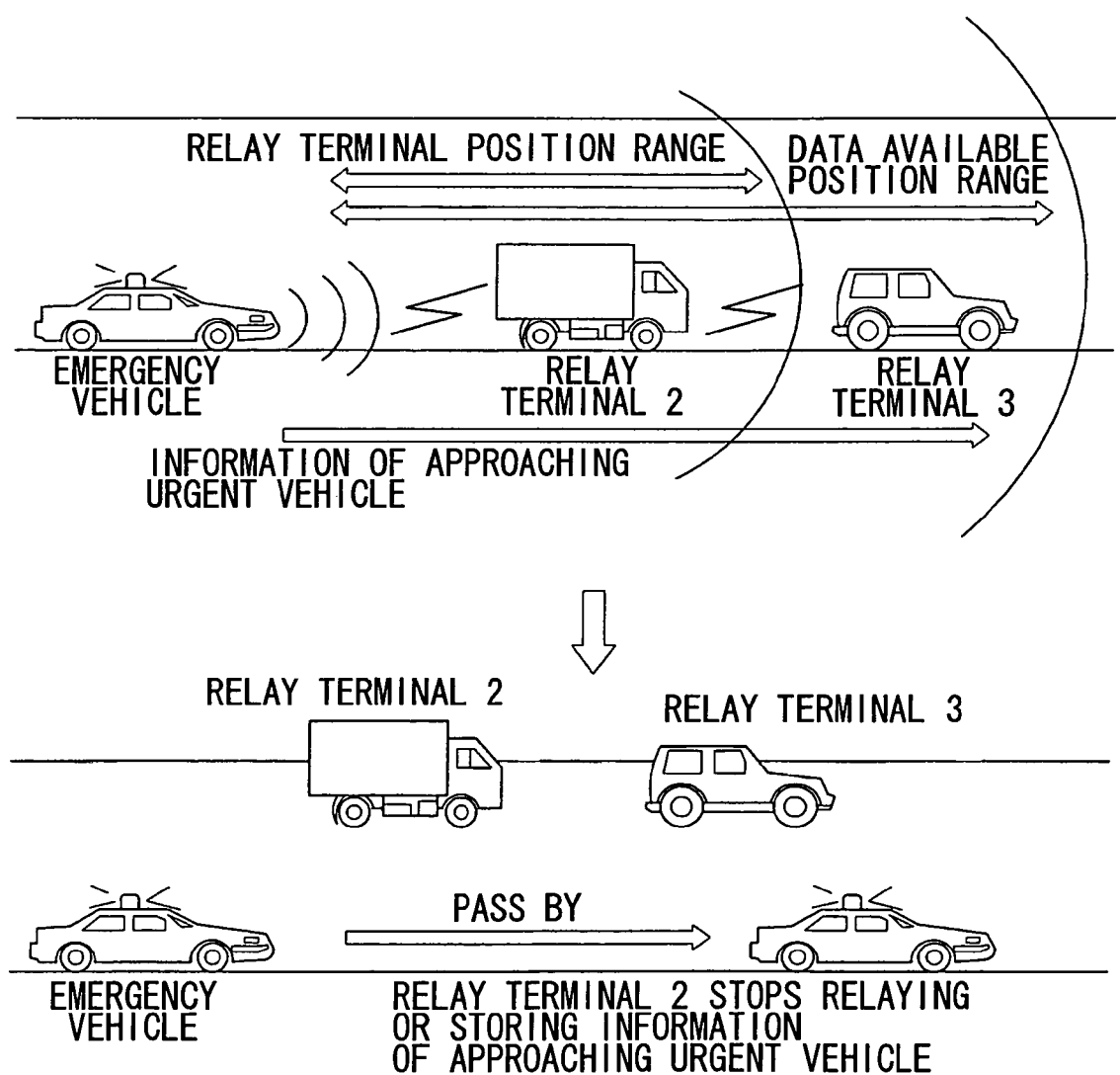
FIG. 6 is the image figure of the car and the emergency vehicle.

FIG. 6 is a figure to explain one implementation of this invention. This is a drawing of approaching emergency vehicle. Hereinafter, explanation of this implementation form applies concrete examples such as the notation of approaching emergency vehicle. FIG. 3 shows the flow chart of the process.

In FIG. 3, the emergency vehicle is information transmission source 1. Relay terminal 2 receives a broadcasted packet from the emergency vehicle via packet receiving part 21 (S21) and calculates the position vector, based on the position of information transmission source 1, from vector calculation part 23 (S22) with reference to the position information of its own. Here, the position vector is based on the position that is shifted only for the position offset from the position information of information transmission source 1, to the reverse direction of the direction of the movement of information transmission source 1.

Vector calculation part 23 calculates cosine θ from the inner product of the above-mentioned position vector and notified movement direction vector (S23). When the packet from information transmission source 1 is taken as a candidate to relay and to accept when cosine θ (S23), calculated from the inner product of the direction vector and position vector, is larger than the cosine of the "available angle range".

For example, when the "available angle range" is 90 degrees and when cosine θ is larger than 0 (S24, cosine θ>α), vector calculation part 23 takes the packet from information transmission source 1 as a candidate and supplies it.

When the packet from information transmission source 1 is a candidate, relay judging part 24 calculates the size of position vector. Also, relay judging part 24 relay the packet from information transmission source 1 when the size of position vector is smaller than "relay terminal position range" (S25, S26). Also, relay judging part 24 decides to ignore the data from information transmission source 1 when the size of position vector is larger than "relay terminal position range" (S25, S29). Acceptance judging part 25 compares the size of position vector, calculated by relay judging part 24, to "data available position range" (S27). When the size of the position vector is smaller than the "data available position range", application execution part 27 decides to accept data from information transmission source 1(S28) and executes an appropriate program.

Details are explained below.

First, the emergency vehicle, which is information transmission source 1, transmits the broadcasted packet including its own "position information", "traveling direction", "position offset", "relay terminal position range", "data available position range", and "available angle (90 degrees)". Hereafter, the broadcasted packet is called a notification packet for approaching emergency vehicle.

The car (relay terminal 2), which received the notification packet for approaching emergency vehicle, calculates the position vector, starting from information transmission source 1, referring to its own position information.

Next, relay terminal 2 calculates cosine θ from the inner product of the direction vector, transmitted from information transmission source 1, and the position vector, calculated above. Also, relay terminal 2 compares cosine θ and the notification packet for approaching emergency vehicles. That is, relay terminal 2 relays the packet when the distance from relay terminal 2, providing in the car, to information transmission source 1, providing in the emergency vehicle, is less than "relay terminal position range" and moreover, when the position vector "from the emergency vehicle position to the car position" and direction vector, transmitted from information transmission source 1, have same direction in the range of ±90° (calculated inner product is positive).

In this case, the vector, from the emergency vehicle to the car, starts from the position of the emergency vehicle, but is shifted for position offset (for example, about 20 meters to the back of the emergency vehicle). In other words, relay terminal 2 should stop the relay when information transmission source 1, the emergency vehicle, passes by a little.

Similarly, relay terminal 2 receives packets and outputs them to the application, when the distance between the car and the emergency vehicle is less than the "data available position range", and moreover, when the vector, from a position of the emergency vehicle to the position of the car, and the direction vector, received from information transmission source 1, are in the same direction (an inner product is positive) in the range of ±90 degrees.

In this implementation, one packet has sufficient capacity for urgent information to be sent and the latest position information can be attached to the packet anytime. Furthermore, the vector from the emergency vehicle to the car, its starting position is not the position of the emergency vehicle, but is an offset position (for example, about 20 meters behind the back of the emergency vehicle) is applied.

Besides, relay terminal 2 can be controlled to relay packets, received from the emergency vehicle equipping information transmission source 1, to other vehicles providing relay terminal 3-n only when "cosine θ>α". Here, α is a fixed real number. In other words, relay terminal 2 relays packets only when its own vehicle is in the range among arccosine α. For example, relay terminal 2 relays packets to other vehicles among ±45 degrees, in the direction the emergency vehicle moves, when α=1/√2.

Also, the direction can be the direction to the final destination for the emergency vehicle. It will be helpful for vehicles around the emergency vehicle, to avoid being disturbed every time the emergency vehicle turns and to decide the range to broadcast packets.

Here, (1) is the formula expressing position vector of the car, (2) is the formula expressing the speed vector of the car, (3) is the formula expressing the position vector, received from the emergency vehicle, (4) is the formula expressing the speed vector, received from the emergency vehicle.

$$\vec{L}_1 = (x_1, y_1) \tag{1}$$

$$\vec{V}_1 = (v_{x1}, v_{y1}) = (v_1 \sin\theta_1, v_1 \cos\theta_1) \tag{2}$$

$$\vec{L}_2 = (x_2, y_2) \tag{3}$$

$$\vec{V}_2 = (v_{x2}, v_{y2}) = (v_2 \sin\theta_2, v_2 \cos\theta_2) \tag{4}$$

Here, $v_1$ is the speed of the car equipping relay terminal 2, $\theta_1$ is the direction of the movement of the car equipping relay terminal 2. $v_2$ is the movement speed of the emergency vehicle equipping information transmission source 1, and it makes $\theta_2$ to the direction of the movement of the emergency vehicle equipping information transmission source 1. Also, γ[m] is coefficients of position offsets. Also, a judgment formula is the following formula (5).

$$\cos\theta = \frac{\left[\vec{L}_1 - \vec{L}_2 - \gamma \frac{\vec{V}_2}{|\vec{V}_2|}\right] \cdot \vec{V}_2}{\left|\vec{L}_1 - \vec{L}_2 - \gamma \frac{\vec{V}_2}{|\vec{V}_2|}\right| |\vec{V}_2|} > \alpha \tag{5}$$

Here, "·" is the inner product and (χ1, y1)·(χ2, y2)=χ1χ2+y1y2.

Figure 4:
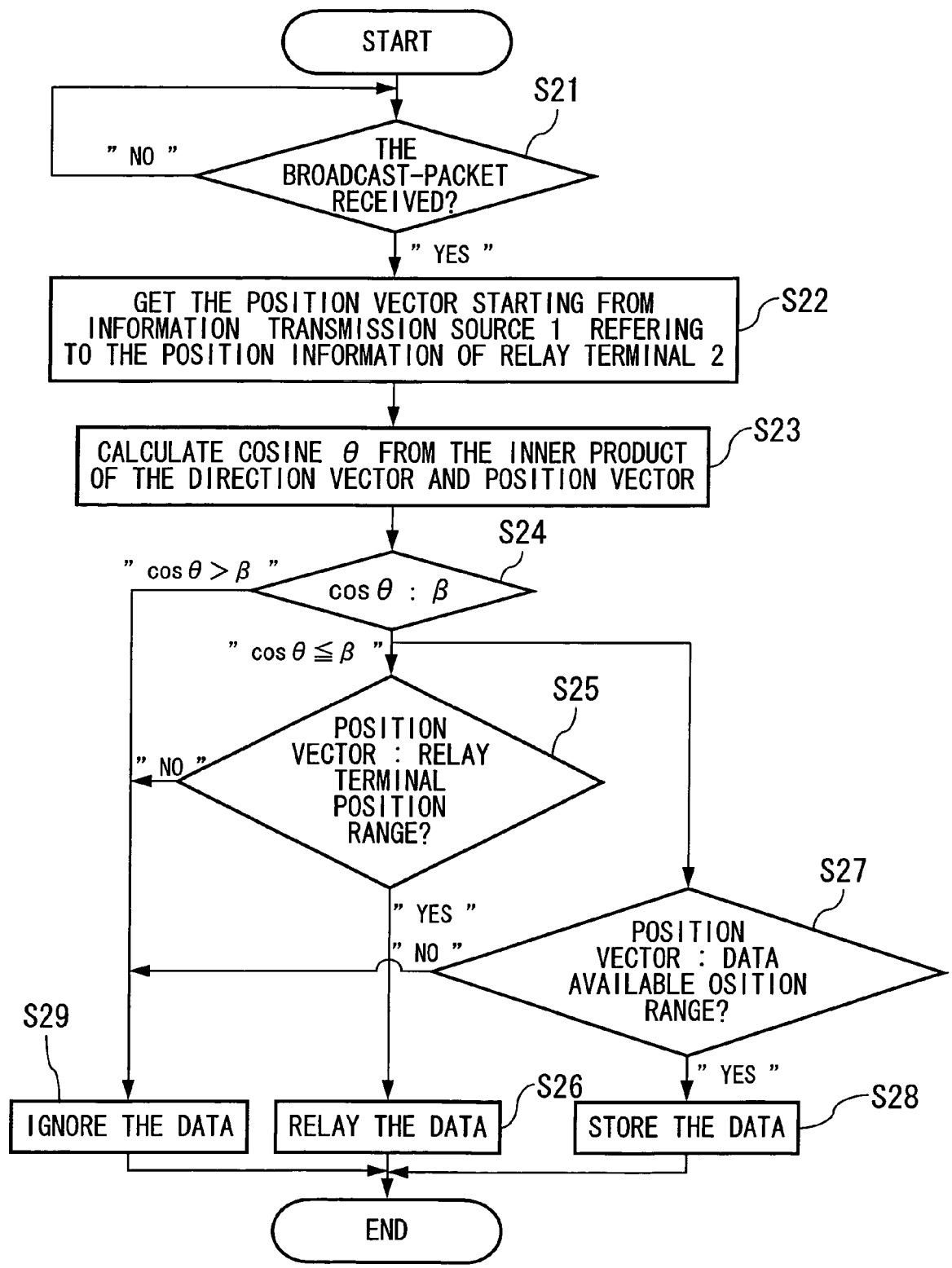
FIG. 4 shows another flow chart of the process in relay terminal.
Figure 7:
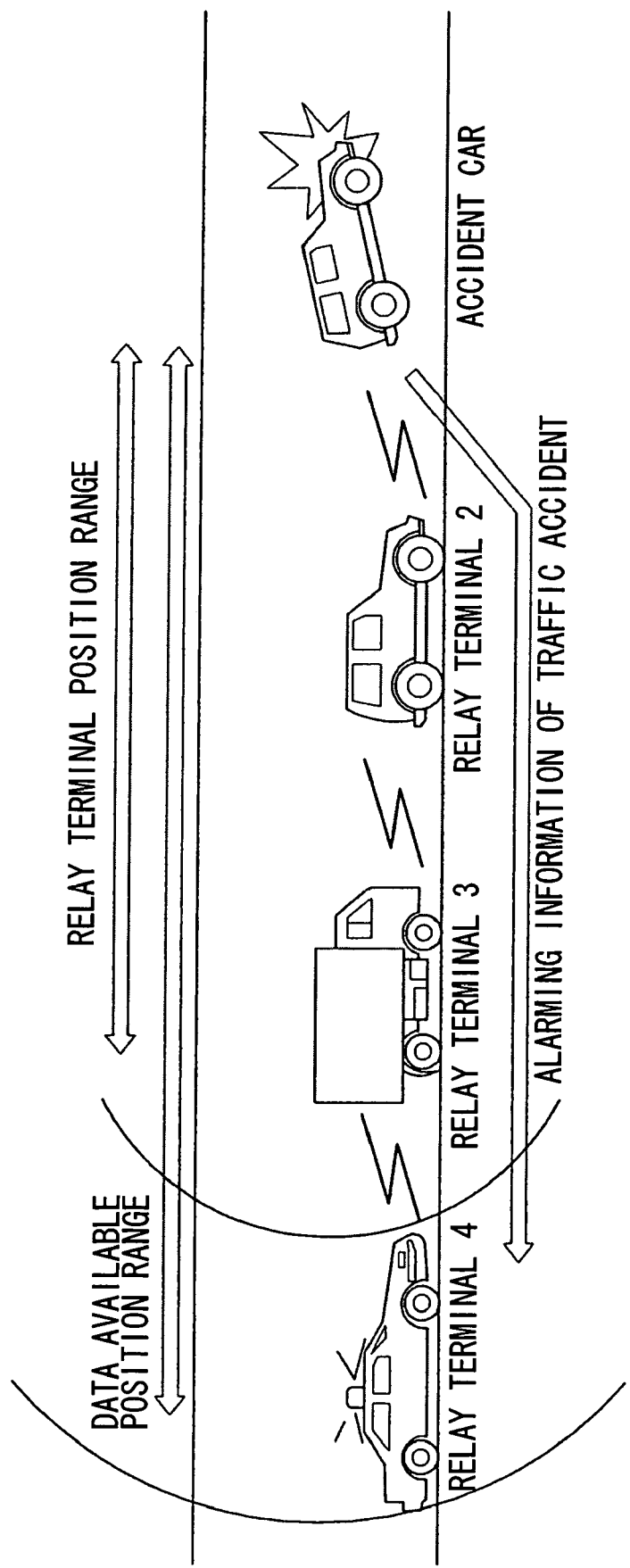
FIG. 7 is the image figure of the accident car and the emergency vehicle.

FIG. 7 is the figure which explains the other implementation form of this invention. In this figure, an image of broadcasting the accident information is shown. Hereinafter, process flow of this implementation is explained using the concrete examples such as broadcasting the accident information. FIG. 4 is a flow chart showing the process flow.

In FIG. 4, the accident car, which is information transmission source 1, attaches "position information", "position offset", "relay terminal position range", "data available position range", and "available direction" to the broadcast packet, and transmits them. Relay terminal 2, providing in the car, receives the broadcast packet from information transmission source 1 via packet receiving part 21 (S21) and vector calculation part 23 gets the position vector, from the position of the information transmission source 1 to relay terminal 2, referring to its own position information (S22). In this process, vector calculation part 23 calculates above-mentioned position vector based on the position which is shifted from the position of information from transmission source 1 just for the position offset. Then, vector calculation part 23 calculates cosine θ from the inner product of the position vector and vector of the direction of its movement, and outputs cosine θ to both relay judgment part 24 and acceptance judgment part 25 (S23).

Relay judgment part 24 checks cosine θ (S24). When cosine θ is smaller than a specific value β, for example 0, relay judgment part 24 takes the received packet as a candidate for relay and expects to extract data from the packet. Also, only when the received packet is the candidate for relay, relay judgment part 24 checks the size of position vector (S25). When the size of position vector is smaller than "relay terminal position range" of the received packet, relay judgment part 24 relays the packet (S26) and when the size of position vector is larger than "relay terminal position range", relay judgment part 24 ignores the packet (S29).

Also, acceptance judgment part 25 checks the size of the position vector. When the size of the position vector is smaller than the "data available position range", acceptance judgment part 25 stores the data (S28). After that acceptance judgment part 25 requires application execution part 27 to execute the appropriate application program.

Next, the implementation described above is explained to detail with a concrete example of alerting information about a traffic accident. First, the accident car transmits the broadcasted packet (hereafter, an accident information packet) including "position information" of the accident car, "position offset", "relay terminal position range", "data available position range", "available angle (in this case, 90 degrees)".

The car receives the accident information packet, and calculates distance from the accident car referring to the received packet. The car relays the packet only when the distance from the accident car is less than the "relay terminal position range" and when the position vector of "the accident car to the car which received the packet" and direction vector of its movement turn to opposite ±90 degrees to each other (when the inner product is negative).

The car receives the broadcasted packet from the accident car and calculates the position vector from the accident car to the car referring to its own position information.

In this process, the car calculates the position vector based on the position which was shifted (in order to stop the relay just a little after the car passes by the accident car) from the position of the accident car just for the position offset (for example 20 meters behind the accident car).

Similarly the car receives the packet and passes it to the application program when the distance from the accident car is less than "data available position range" and when the position vector of the accident car to the car, received the packet, and direction vector turn to opposite ±90 degrees to each other (when the inner product is negative).

However, when the car detects "cosine θ<β", it is also preferable to have a rule of the packet receiving and sending process like that the car relays only when the accident car is ahead of the car and in the angle range of arccosine β. For example, when β=1/√2, the car relays only in the case in which the accident car is in ±45 degrees ahead of the car.

Figure 8:
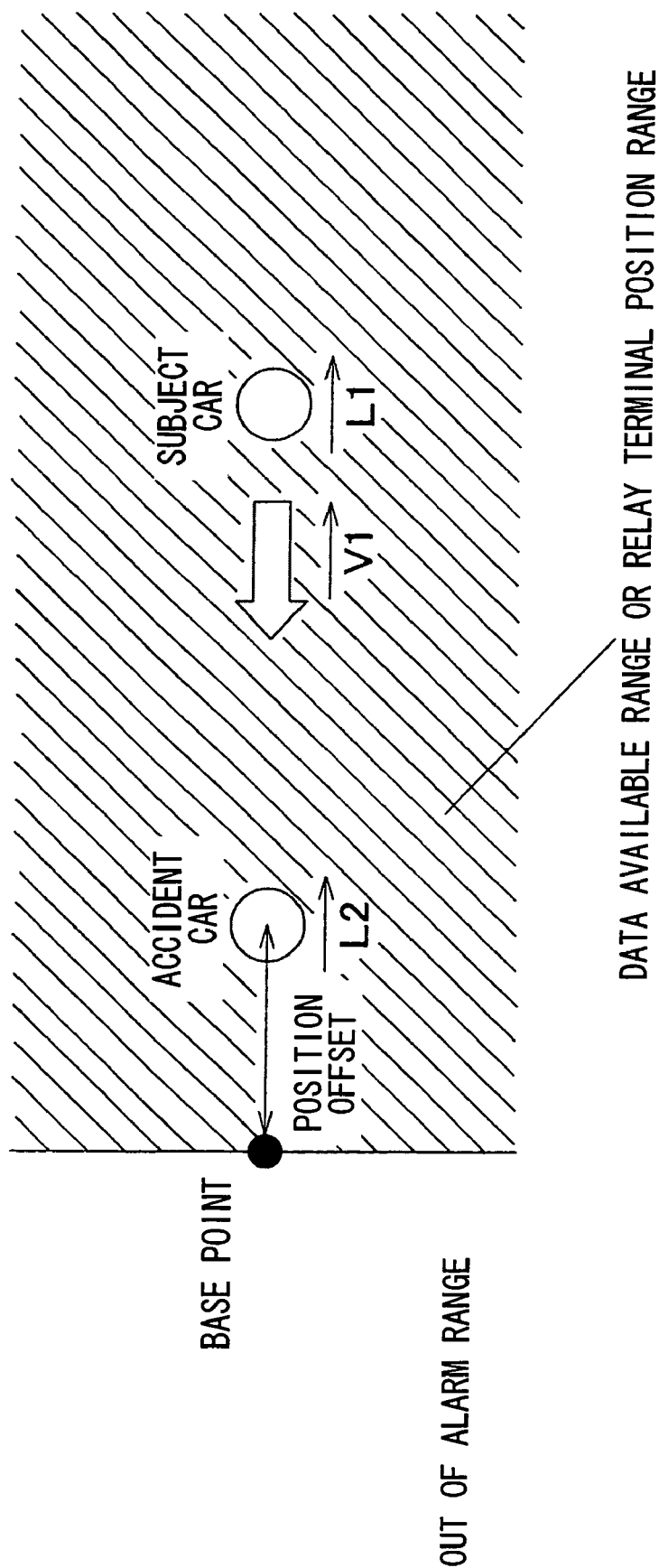
FIG. 8 describes the position of the accident car and the emergency vehicle in another implementation form of this invention.

The judgment formula is shown in (6) below and the position of the car is shown in FIG. 8.

$$\cos\theta = \frac{\left[\vec{L}_1 - \vec{L}_2 - \gamma\frac{\vec{V}_1}{|\vec{V}_1|}\right] \cdot \vec{V}_1}{\left|\vec{L}_1 - \vec{L}_2 - \gamma\frac{\vec{V}_1}{|\vec{V}_1|}\right|\left|\vec{V}_1\right|} < \beta \tag{6}$$

Here, "·" is the inner product and (χ1, y1)·(χ2, y2)=χ1χ2+y1y2.

Figure 9:
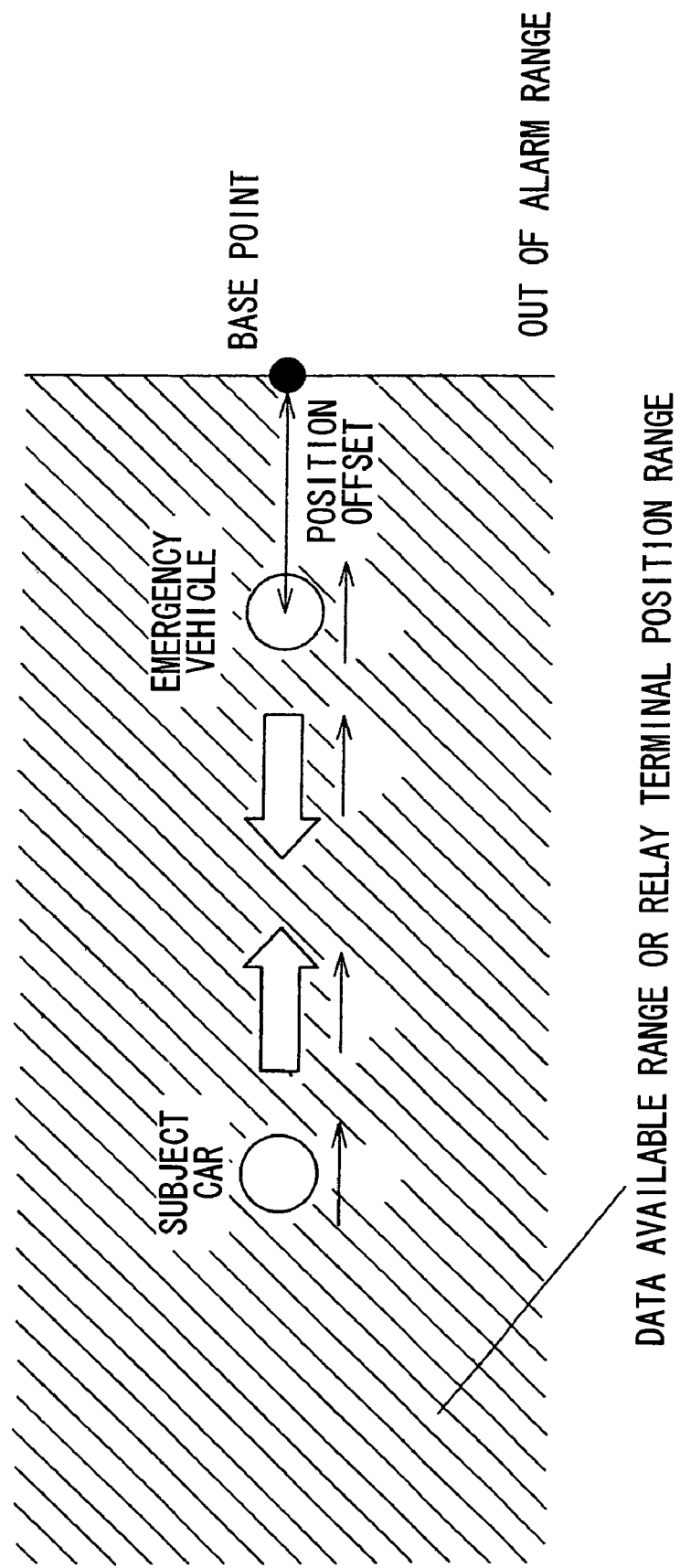
FIG. 9 describes the position of the accident car and the emergency vehicle.

Next, in another form of this invention, only when the car and the information transmission source car are facing each other, the car relays or stores the packets from the information transmission source car. FIG. 9 shows the situation including the car and the information transmission source car. The judgment formulas in this case are (7) and moreover (8) below.

$$\cos\theta_1 = \frac{\vec{V}_2 \cdot \vec{V}_2}{|\vec{V}_1||\vec{V}_2|} < \beta_1 \tag{7}$$

$$\cos\theta_2 = \frac{\left[\vec{L}_1 - \vec{L}_2 - \gamma\frac{\vec{V}_2}{|\vec{V}_2|}\right] \cdot \vec{V}_2}{\left|\vec{L}_1 - \vec{L}_2 - \gamma\frac{\vec{V}_2}{|\vec{V}_2|}\right|\left|\vec{V}_2\right|} > \beta_2 \tag{8}$$

Next, in another form of this invention, only when the car and the information transmission source car are going to be moving away from each other, the car relays or stores the packets from the information transmission source car. The judgment formulas in this case are (9) and (10) below.

$$\cos\theta_1 = \frac{\vec{V}_1 \cdot \vec{V}_2}{|\vec{V}_1||\vec{V}_2|} < \beta_1 \tag{9}$$

$$\cos\theta_2 = \frac{\left[\vec{L}_1 - \vec{L}_2 - \gamma\frac{\vec{V}_2}{|\vec{V}_2|}\right] \cdot \vec{V}_2}{\left|\vec{L}_1 - \vec{L}_2 - \gamma\frac{\vec{V}_2}{|\vec{V}_2|}\right|\left|\vec{V}_2\right|} > \beta_2 \tag{10}$$

Next, in another form of this invention, only when the information transmission source car is on the right side or left side of the car does the car relay or store the packets from the information transmission source car. The judgment formulas in this case is (11) below.

$$\beta_1 < \cos\theta = \frac{(\vec{L}_1 - \vec{L}_2) \cdot \vec{V}_2}{|\vec{L}_1 - \vec{L}_2||\vec{V}_2|} < \beta_2 \tag{11}$$

From the explanation above, in this invention, a relay terminal checks and determines whether to relay the received broadcast packet to terminal that requires information, referring to the direction vector and position information in the packet.

According to this invention, wireless terminals can avoid wasting the resources and each relay terminal can avoid sending packets which are unnecessary, so that terminals can avoid wasting electric power.

This invention is effective especially for broadcasting information about approaching emergency vehicle, broadcasting traffic accident information in ITS and information distribution in an ad hock network.

Moreover, it is possible to construct a wireless network system and relay terminal in this invention with a computer-readable storage medium that contains the processing steps of packet receiving part 21, self-position information acquisition part 22, vector calculation part 23, relay judging part 24, acceptance judging part 25, data transmitting part 26 and application execution part 27, and the computer that reads and executes the program.

The computer herein contains OS and hardware such as the peripheral devices.

Also, when a "computer system" is connected to the WWW, this system contains home page provision environments (or display environments), too.

Also, the program, described above, can be transmitted from one computer, which stores the program in the storage and so on, to other computers via a transmission medium or transmission waves.

Here, a "transmission medium", which transmits the program, is a medium providing the function to transmit information like the internet or other networks (communication networks), or telephone lines or other communications lines (telecommunication line).

Also, the program, described above, can provide some parts of the above mentioned functions.

Moreover, the program, described above, can realize the above mentioned functions together with the program already stored in the computer. This type of program can be a so-called difference file (difference program).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless network system relaying a broadcast signal in multiple stages and distributes data to terminals there around, comprising:
   an information transmission source terminal which is mobile and which generates the broadcast-signal; and
   a relay terminal which is mobile which, in reference to position information and a moving direction of the relay terminal, determines whether or not it is necessary to relay a broadcast packet based on a direction vector indicating a moving direction of the information transmission source terminal and position information of the information transmission source terminal, and which transmits the broadcast packet if the moving direction of the relay terminal is in a predetermined angle compared to the moving direction of the information transmission source terminal,
   wherein said relay terminal determines whether or not to relay the broadcast packet based on relay position range in the broadcast packet, specified by the information transmission source terminal.

2. A relay terminal which is movable in a wireless network system which relays a broadcast-signal in multiple stages and distributes data to terminals there around, comprising:
   a packet receiving part which receives a broadcast packet from an information transmission source terminal which is mobile;
   a self-position information acquisition part which determines its own position; and
   a relay judging part which determines whether or not it is necessary to relay the broadcast packet based on a direction vector indicating a moving direction of the information transmission source and position information of the information transmission source terminal included in the broadcast packet, and which determines to transmit the broadcast packet if the direction of the relay terminal is in a predetermined angle compared to the direction of the information transmission source,
   wherein said relay judging part determines whether or not to relay the broadcast packet based on relay position range in the broadcast packet, specified by the information transmission source terminal.

3. The relay terminal in accordance with claim 2, further comprising:
   an acceptance judging part which determines whether or not to accept the broadcasted packet based on a data available range in the broadcast packet, specified by the information transmission source terminal.

4. A computer program stored on a non-transitory computer readable storage medium for a relay terminal which is movable in a wireless network system and which relays a broadcast signal in multiple stages and distributes data to terminals there around, comprising:
   a packet receiving process which receives a broadcast packet from an information transmission source which is movable;
   a self-position information acquisition process which obtains position of the relay terminal; and
   a relay judging process which determines whether or not to relay the broadcast packet based on a direction vector in the broadcast packet indicating a moving direction of the information transmission source, specified by the information transmission source terminal, and position information, and which determines to transmit the broadcast packet if the direction of the relay terminal is in a predetermined angle compared to the direction of the information transmission source,
   wherein said relay judging process determines whether or not to relay the broadcast packet based on relay position range in the broadcast packet, specified by the information transmission source terminal.

* * * * *